(12) United States Patent  
Sermersheim et al.

(10) Patent No.: US 8,291,213 B2  
(45) Date of Patent: Oct. 16, 2012

(54) TECHNIQUES FOR SECURE NETWORK SEARCHING

(75) Inventors: James Gerald Sermersheim, Woodland Hills, UT (US); Stephen R. Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 13/193,016

(22) Filed: Jul. 28, 2011

(65) Prior Publication Data

US 2011/0283114 A1 Nov. 17, 2011

Related U.S. Application Data

(63) Continuation of application No. 11/857,690, filed on Sep. 19, 2007, now Pat. No. 8,010,779.

(51) Int. Cl.  
*H04L 9/00* (2006.01)

(52) U.S. Cl. ........... 713/150; 726/26; 707/706; 707/770

(58) Field of Classification Search .................. None  
See application file for complete search history.

(56) References Cited

U.S. PATENT DOCUMENTS

| | | |
|---|---|---|
| 5,855,018 A | 12/1998 | Chor et al. |
| 6,366,915 B1 * | 4/2002 | Rubert et al. ................. 707/770 |
| 6,687,897 B2 | 2/2004 | Guinart |
| 6,785,810 B1 | 8/2004 | Lirov et al. |
| 7,035,827 B2 | 4/2006 | Ezaki |
| 7,043,482 B1 | 5/2006 | Vinsonneau |
| 7,181,448 B2 | 2/2007 | Silverbrook et al. |
| 7,770,204 B2 | 8/2010 | Pathakis et al. |
| 7,792,813 B2 | 9/2010 | Selberg |
| 7,845,011 B2 * | 11/2010 | Hirai ............................... 726/26 |
| 2001/0047365 A1 | 11/2001 | Yonaitis |
| 2002/0029340 A1 | 3/2002 | Pensak et al. |
| 2003/0158839 A1 | 8/2003 | Faybishenko et al. |

(Continued)

OTHER PUBLICATIONS

"CustomScoop: Powerful Online News Clipping with Robust Analytics", http://www.customscoop.com/products/clipiqprofessional.cfm, (Copyright 2000-2007).

(Continued)

*Primary Examiner* — Ponnoreay Pich  
(74) *Attorney, Agent, or Firm* — Schwegman, Lundberg & Woessner, P.A.

(57) ABSTRACT

Techniques for network searching are provided. A search is defined and the search is encrypted in a format known to a search service. Return instructions are defined for delivering search results of the search to a principal that defined the search and the return instructions. The return instructions are encrypted in a different format know to a return search process. The encrypted search is delivered to the search service for processing the search and the encrypted return instructions are delivered to the return search process for handling search results provided by the search service and for conforming delivery of the search results to the return instructions.

20 Claims, 5 Drawing Sheets

U.S. PATENT DOCUMENTS

| | | |
|---|---|---|
| 2003/0177124 A1 | 9/2003 | Sauri |
| 2003/0208690 A1 | 11/2003 | Aull |
| 2004/0034628 A1 | 2/2004 | Numao et al. |
| 2004/0193905 A1 | 9/2004 | Lirov et al. |
| 2005/0055327 A1 | 3/2005 | Agrawai et al. |
| 2005/0071239 A1 | 3/2005 | Tormey et al. |
| 2005/0091327 A1 | 4/2005 | Koch |
| 2005/0120233 A1 | 6/2005 | Halcrow |
| 2006/0184512 A1 | 8/2006 | Kohanim et al. |
| 2007/0005594 A1 | 1/2007 | Pinkas et al. |
| 2007/0180258 A1 | 8/2007 | Broussard et al. |
| 2007/0208745 A1 | 9/2007 | Ture et al. |
| 2007/0214129 A1 | 9/2007 | Ture et al. |
| 2009/0077060 A1 | 3/2009 | Sermersheim et al. |

OTHER PUBLICATIONS

"Press Clipping Services", http://www.ereleases.com/clipping_services.html, eReleases (MEK Enterprises LLC), (Copyright 1998-2007).

"Press Clippings", http://www.burrellesluce.com/Press_Clipping_Service/default.php?src=, BurrellesLuce, (2007).

* cited by examiner

TECHNIQUES FOR SECURE NETWORK SEARCHING

This application is a continuation of U.S. patent application Ser. No. 11/857,690, filed on Sep. 19, 2007, now issued as U.S. Pat. No. 8,010,779, which is incorporated herein by reference in its entirety.

BACKGROUND

It is very common for information to be posted in print and now simultaneously on-line via the Internet and World-Wide Web (WWW). The information can be sensitive, such as legal information or information that impacts an individual, an industry, and/or an enterprise.

For example, a plan to change zoning for an area in a city or county is often posted in print (via a newspaper most likely) and on-line via the city/county WWW site. The information about the zoning change is posted in accordance with law to permit interested and impacted parties to comment on the planned change. However, much time must be invested to seek out and evaluate such information.

Moreover, this same type of information is also of interest to enterprises that make a profit from such information. For example, a tax sale on a property of high interest to an enterprise. Thus, this kind of enterprise will seek out this kind of information as a part of its normal business. Furthermore, the fact that someone is evaluating this kind of information is, in its self, valuable information to a competitor. That is, competitors may want to know what an enterprise is up to and this can be ascertained via the searches that the enterprise is performing.

Accordingly, there is a need for improved security when processing network searches.

SUMMARY

In various embodiments, techniques for secure network searching are provided. More specifically, and in an embodiment, a method is provided for secure network searching. A search and return process instructions are acquired for subsequent delivery of search results of the search. The search and return process instructions are initially defined by a principal. The search is encrypted with a first public key of a search service that is to perform the search, and the return process instructions are encrypted with a second public key of a return process that is to return the search results. The encrypted search is submitted to the search service and the encrypted return process instructions are submitted to the return process. Finally, the search results are received in accordance with the return process instructions.

DETAILED DESCRIPTION

Figure 1:
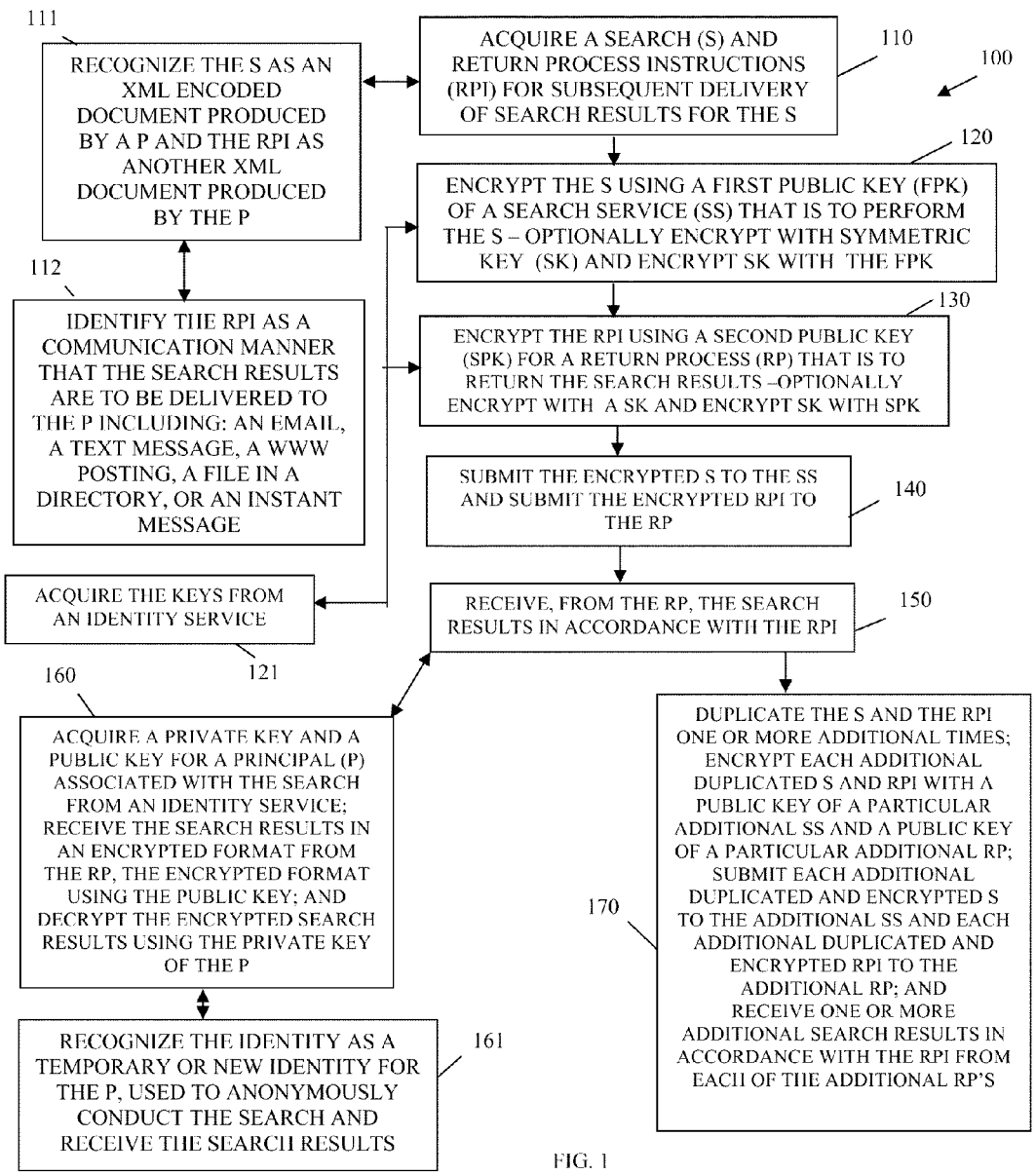
FIG. 1 is a diagram of a method for secure network searching, according to an example embodiment.

A "resource" includes a user, content, a processing device, a node, a service, an application, a system, a directory, a data store, groups of users, combinations of these things, etc. The terms "service," "process," and "application" may be used interchangeably herein and refer to a type of software resource that includes instructions, which when executed by a machine performs operations that change the state of the machine and that may produce output.

An "identity service" refers to a yet another special type of resource that is designed to manage and supply authentication services and authentication information for resources. So, an identity service may authenticate a given resource for access to a variety of local and external services being managed by that identity service. A single resource may have multiple identity services. In addition the identity service itself may be viewed as a type of resource. In this manner, identity service may authenticate and establish trust with one another viewing one another as specific type of resource.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

An identity service may also provide single sign-on services to a resource. That is, a resource may sign-on to an identity service and acquire identities and credentials to access a variety of other services or resources. In some cases, the identity service is modified or enhanced to perform some of the teachings presented herein and below.

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

The identity may also be a special type of identity that the resource assumes for a given context. For example, the identity may be a "crafted identity" or a "semantic identity." An example for creating and using crafted identities may be found in U.S. patent application Ser. No. 11/225,993; entitled "Crafted Identities;" filed on Sep. 14, 2005; and the disclosure of which is incorporated by reference herein. An example for creating and using semantic identities may be found in U.S. patent application Ser. No. 11/261,970; entitled "Semantic Identities;" filed on Oct. 28, 2005; and the disclosure of which is incorporated by reference herein.

Various embodiments of this invention can be implemented in existing network architectures, proxies, machines (processing devices), existing products as enhancements to those products, and/or existing Operating Systems (OS's) as specialized services.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-5.

FIG. 1 is a diagram of a method 100 for secure network searching, according to an example embodiment. The method 100 (hereinafter "security search service") is implemented as instructions in a machine-accessible and readable medium. The instructions when executed by a machine perform the processing depicted in FIG. 1. According to an embodiment, the security search service is also operational over and processes within a network. That network may be wired, wireless, or a combination of wired and wireless. In an environment, the network is a Wide-Area Network (WAN), such as the Internet.

At 110, the security search service acquires a search and return process instructions for subsequent delivery of search results; the search results provided in response to executing the search. Furthermore, the search and the return process instructions are initially defined by a principal.

The search is defined in terms of search criteria and is defined by the principal. The search may identity a particular source for searching; although this does not have to be the case as the search service that executes the search on behalf of the principal may determine the sources for searching. However, the search may restrict the search to particular groupings of sources or topics. In fact, any level of custom granularity can be defined in the search.

The return process instructions are also defined by the principal. Additionally, the return process instructions define how, when, and/or where search results that result from the search are to be provided to the principal. For example, the return process instructions may define a packaging mechanism for providing the search results, may define a time for delivery of the search results, and/or may define a communication channel for delivering the search results.

Specifically, and in an embodiment, at 111, the security search service recognizes the search as an extensible markup language (XML) encoded document, which is produced by the principal. Similarly, the return process instructions are recognized as another and different XML encoded document produced by the principal.

As was previously mentioned, and in an embodiment, at 112, the security search service identifies at least a portion of the return process instructions as a particular communication manner that the search results are to be delivered in when provided to the principal. Some example communications include, by way of example only, an email communication, a text message communication, a WWW posting communication, a file located in a pre-designated directory or location, an instant message communication, etc.

At 120, the security search service encrypts the search with a first public key associated with the search service that is to execute the search on behalf of the principal. A second public key is also associated with the return process. Optionally, at 120, the security search service may encrypt the search service using any symmetric key and then use the first public key of the principal to encrypt the symmetric key. Thus, the actual encryption of the search can be achieved via using the first public key in the following manner. The search is encrypted using a symmetric key. The symmetric key is communicated to the search service in encrypted format where the symmetric key is encrypted via the first public key.

In an embodiment, at 121, the first public key and the second public key associated with the search service and the return process, respectively, are acquired from an identity service. Access to the identity service is secure and trusted and uses authentication to ensure the proper identities of those accessing the identity service. Policy also drives access to the identity service once an identity is authenticated for access. Example identity services were discussed in detail above and incorporated by reference herein and above.

At 130, the security search service encrypts the return process instructions with the second public key that is associated with the return process. The return process is to acquire the search results from the search service and deliver the search results to the principal (directly or indirectly via a principal-based service). Again, and optionally, at 130, the security search service encrypts the return process instructions with a symmetric key known to the security search service and the return process. The symmetric key may then be encrypted with the second public key. So, the actual encrypt may be achieved via the use of the public key and does not in every case require that encryption to be done via the public key, since encryption can be any symmetric key known to the security search service and the return process and communicated to the return process by encrypting the symmetric key with the public key of the return process.

At 140, the security search service submits the encrypted search to the search service that is to perform the search. The search itself can identity the search service. Alternatively, policy may identify the search service to use or the principal may manual supply the search service for use. At 140, the security search service also submits the encrypted return process instructions to the return process.

At 150, the security search service subsequently receives the search results in accordance with the originally provided return process instructions. That is, the return process conforms the search results to the return process instructions on behalf of the principal According to an embodiment, at 160, the security search service acquires a private key for an identity of the principal and a public key for the identity of the principal. Again, these keys can be acquired via an identity service. So, when the search results are received from the return process they may be in an encrypted format that the return process used using the public key of the principal. If this is the situation, the security search service decrypts the encrypted search results using the private key of the principal.

In some cases, at 161, the security search service may recognize the identity as a temporary identity or new identity for the principal. This temporary identity is used to anonymously conduct the search and receive and collect the search results. In other words, the principal uses an identity service to acquire a temporary identity, a crafted identity, or even a semantic identity for doing either an anonymous search or doing a semantic space search. If the search is being done using a temporary, aliased, or masked identity a true identity of the principal remains anonymous when the search is being executed and when the search results are returned. In fact, the security search service may not even know the true identity of the principal, since the principal may initially authenticate to and request the search processing of the security search service using an anonymous identity.

In an embodiment, at 170, the security search service may (according to policy, specific requests of a principal, profiles for the principal, or dictates of the search) duplicate the search and the return processing instructions. Each duplicated instance is associated with a particular different and additional search service and return process. Each additional and duplicated search is encrypted with a particular public key for a particular additional search service. Similarly, each additional and duplicated return processing instructions is encrypted with a particular public key for a particular additional return process. The encrypted versions of this information is then submitted to the appropriate search services and return processes. Finally, one or more additional search results are returned in accordance with the return process instructions. This is received from each of the additional return processes. So, a principal may have a single search processed by multiple search services. The multiple returning search results may be merged or filtered when returned in accordance with profiles or policies.

It is now appreciated how a network search may be conducted in a more secure manner by encrypting the search, having an entity other than the search service collect the results and having the results delivered in a user-defined manner. Additionally, the return process may not be capable of decrypting the search results delivered to it and the search service may not be able to decrypt the encrypted (perhaps dual encrypted) version of the search results delivered from the return process to the principal.

Figure 2:
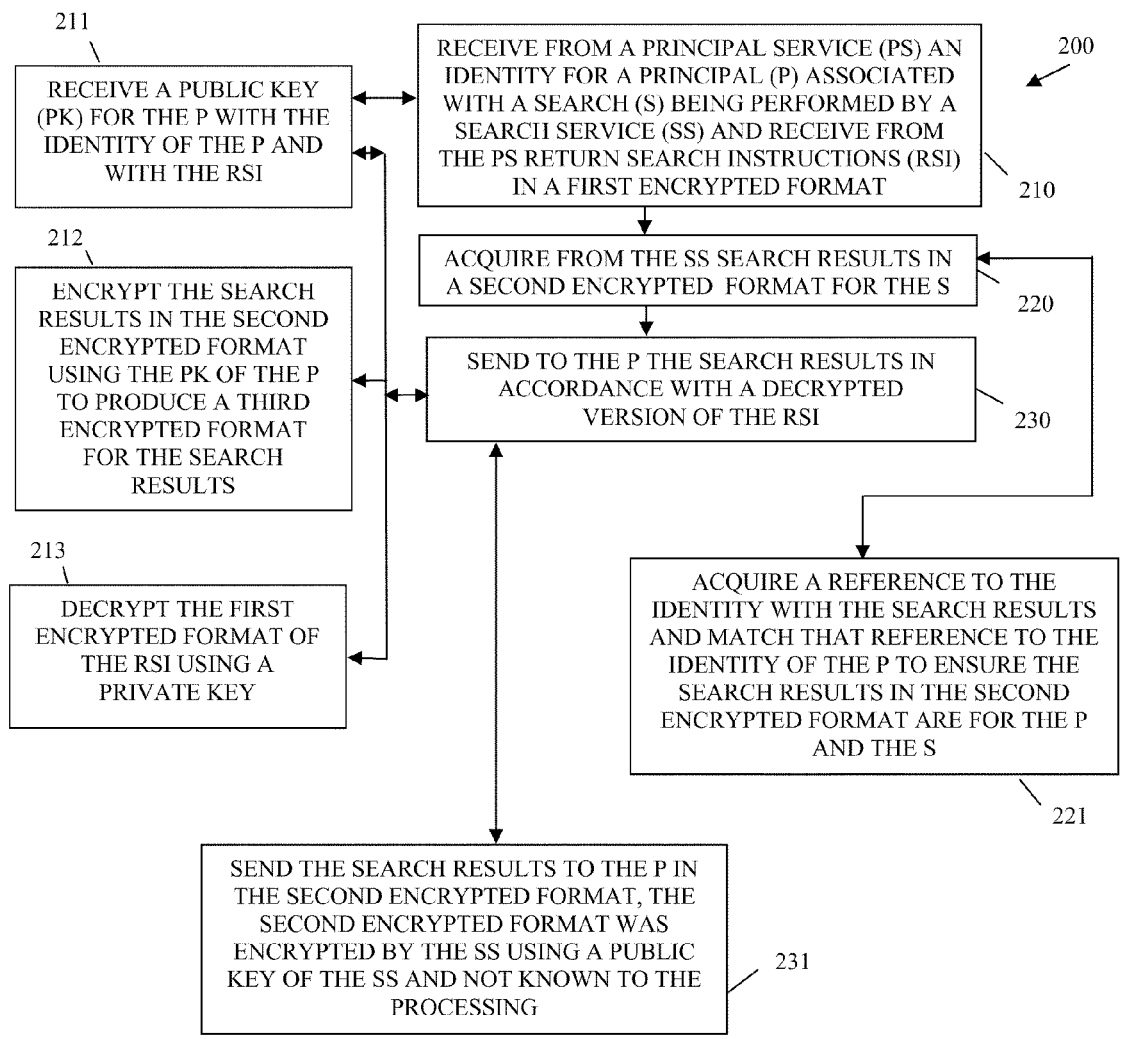
FIG. 2 is a diagram of another method for secure network searching, according to an example embodiment.

FIG. 2 is a diagram of another method 200 for secure network searching, according to an example embodiment. The method 200 (hereinafter "return search service" is implemented in a machine-accessible and readable medium as instructions. The instructions when executed by a machine perform the processing depicted in the FIG. 2. In an embodiment, the return search service may also be operational over a network; and the network may be wired, wireless, or a combination of wired and wireless.

The return search service represents interaction that takes place between the security search service represented by the method 100 of the FIG. 1 to have search results performed by a search service delivered to a principal in accordance with return search instructions.

In an embodiment, the return search service represents processing associated with the return process discussed above with reference to the security search service represented by the method 100 of the FIG. 1.

At 210, the return search service receives from a principal service (such as the security search service of the method 100) an identity for a principal that is associated with a search being performed by a search service. The return search service also receives from the principal service return search instructions in a first encrypted format.

It is well to note that the identity for the principal may be one that is not associated with the true identity of the principal; although it can be in some cases the true identity for the principal. Thus, the identity for the principal can be masked, aliased, semantic, crafted, and in some cases a true identity for the principal.

In an embodiment, at 211, the return search service receives a public for the principal with the identity of the principal and with the return search instructions.

According to an embodiment, at 212, the public key for the identity of the principal may be used by the return search service to encrypt the search results, which may already be in a second encrypted format (encrypted by the search service using a different public key for the identity of the principal), in order to produce a third encrypted format for the search results. The public key is known to the return search service but the public key is not known to the search service; and the different public key used by the search service to produce the second encrypted format is not known to the return search service. So, the return search service cannot decrypt the second encrypted format and the search service cannot decrypt the third encrypted format. This arrangement provides for enhanced security when the search is conducted over a WAN, such as the Internet or WWW, for the principal that requests the search in the first instance.

In another case, at 213, the return search service uses a private key associated with the return search service to decrypt the first encrypted format of the return search instructions. So, the return search instructions are just decrypted by the return search service. This ensures that no information regarding the search and delivery of the results is leaked or obtainable over the network.

At 220, the return search service acquires, from the search service, the search results in a second encrypted format for the search that the search service processed on behalf of the principal.

According to an embodiment, at 221, the return search service acquires a reference to the identity with the search results returned from the search service. This is used to compare and match the reference against the identity for the principal received at 210. The match ensures that the identity is associated with the search and thus the principal and with the search itself.

At 230, the return search service sends to the principal the search results in accordance with a decrypted version of the return search instructions. In other words, the return search service decrypts the return search instructions using a private key known to just the return search service and then follows the instructions and dictates included within the return search instructions to deliver the search results to the principal or the principal service.

In some situations, at 231, the return search service sends the search results to the principal in the second encrypted format that was provided by the search service. Again, the second encrypted format was encrypted by the search service using a public key of the search service and not known to the return search service.

The return search service receives return search instructions in an encrypted manner that can be decrypted by the return search service. Furthermore, the return search service receives the search results from the search service in a second encrypted format that the return search service cannot ascertain and decrypt. Optionally, the return search service can further encrypt the second encrypted format to produce a third encrypted format for the search results. One of ordinary skill in the art can see that such an arrangement increases network searching security, whether that is anonymous or non anonymous.

Figure 3:
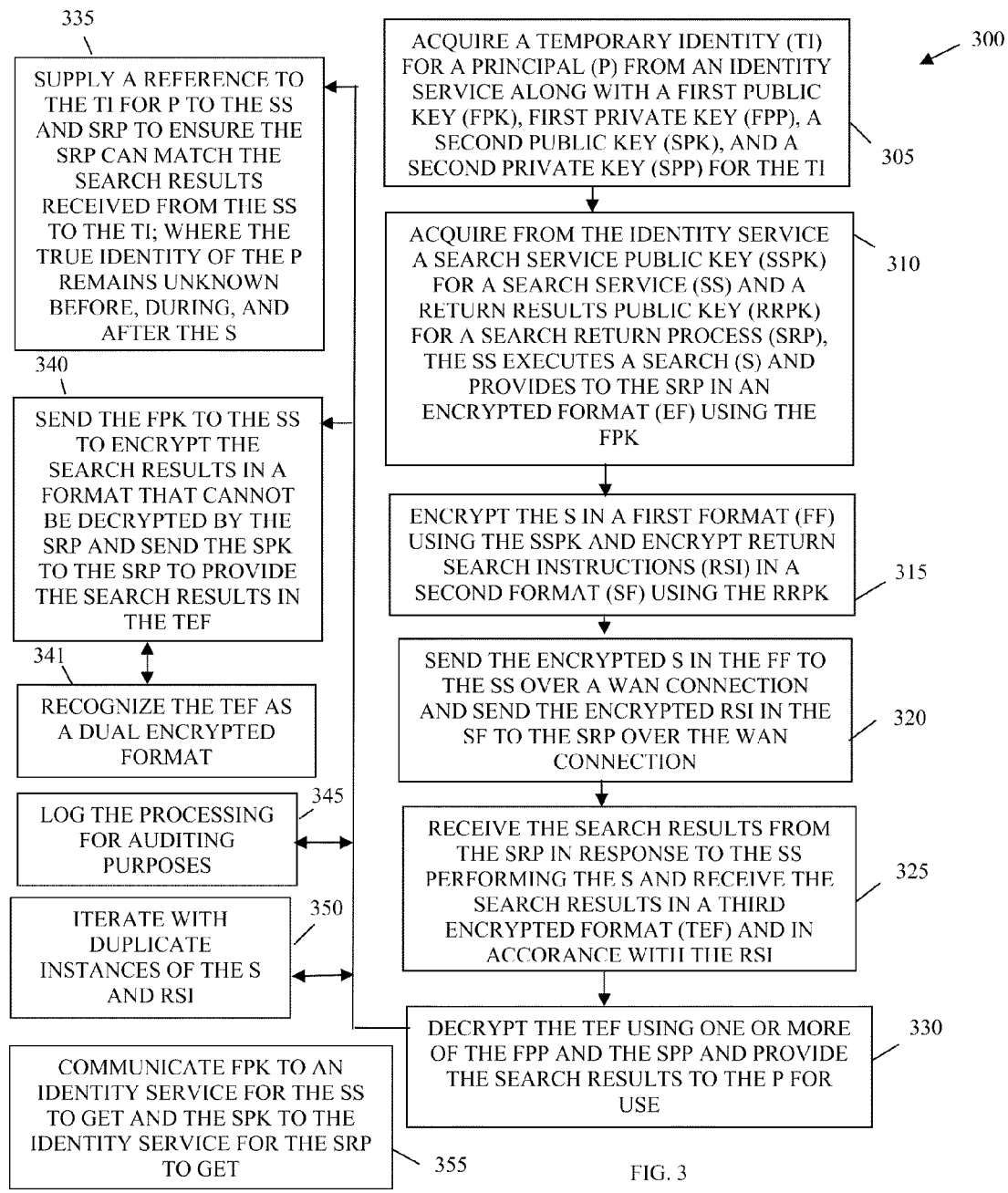
FIG. 3 is a diagram of still another method for secure network searching, according to an example embodiment.

FIG. 3 is a diagram of yet another method 300 for secure network searching, according to an example embodiment. The method 300 (hereinafter "network search service" is implemented in a machine-accessible and readable medium as instructions. The instructions when executed by a machine perform the processing depicted in the FIG. 3. In an embodiment, the network search service may also be operational over a network; and the network may be wired, wireless, or a combination of wired and wireless.

The network search service represents a more detailed and in some ways enhanced perspective of the security search service represented by the method 100 and described in detail above with reference to the FIG. 1. The network search service also interacts with the return search service represented by the method 200 of the FIG. 2 to acquire search results in accordance with return search instructions.

At 305, the network search service acquires a temporary identity for the principal. This identity may be aliased or masked to preserve a true identity for the principal. The temporary identity is acquired from an identity service. Example identity services were discussed and incorporated by reference herein and above.

The network search service also acquires a first public key and a first private key for the temporary identity from the identity service. Moreover, a second public key and a second private key for the temporary identity is acquired from the identity service. So, two public-private key pairs are acquired from the identity service for the temporary identity.

At 310, the network search service acquires from the identity service a search service public key for a search service to use to process a search on behalf of the principal or temporary identity. Additionally, the network search service acquires a return results public key for a search return process. The search service executes the search and the search return process sends the search results back to the principal or a principal service processing within an environment of the principal. The search results are supplied to the search return process in an encrypted format that uses first public key of the temporary identity. The search return process does not know and is not aware of the first public key. Similarly, the search service does not know and is not aware of the second public key of the temporary identity.

At 315, the network search service encrypts the search in a first format using the search service public key and also encrypts the return search instructions in a second format using the return results public key.

At 320, the network search service sends the encrypted search in the first format to the search service over a WAN, such as the Internet. Additionally, the network search service sends the encrypted return search instructions in the second format over the WAN to the search return process. The search service maintains its own private key or can acquire it via an identity service. Similarly, the search return process maintains its own private key or can acquire it via the identity service or a different identity service. The private keys permit the search service to decrypt the search and permit the search return process to decrypt the return search instructions.

At 325, the network search service subsequently receives the search results from the search return process in response to the search service performing the search. The search results are received at the search return process in a third encrypted format. The search results are also received in accordance with the return search instructions.

At 330, the network search service decrypts the third encrypted format for the using one or both of the first private key and/or the second private key associated with the temporary identity of the principal. The decrypted search results are then supplied to the principal for use.

In an embodiment, at 335, the network search service supplies a reference to the temporary identity for the principal to the search service and to the search return process. This ensures that the search return process can match the search results received from the search service to the temporary identity. The true identity of the principal remains unknown before, during, and after the search to the search service and the search return process. In fact, in an embodiment, the true identity of the principal remains unknown before, during, and after the search to the network search service.

In an embodiment, at 340, the network search service sends the first public key for the temporary identity to the search service for the search service to encrypt the search results in a format that cannot be decrypted by the search return process. The network search service also sends the second public key for the temporary identity to the search return process; so that the search return process can use the second public key to produce the third encrypted format for the search results before delivery back to the network search service.

In some cases, at 341, the network search service recognizes the third encrypted format as a dual-encrypted format for the search results. In other words, when the search return process gets the search results, they are already encrypted by the search service. The search return process then encrypts that encrypted version to produce a third encrypted format that is doubly encrypted or includes nested encryption. The dual private keys (first and second private keys) known to the network search service for the temporary identity permit the network search service to decrypt this doubly encrypted version of the search results.

In another situation, at 345, the network search service logs the processing actions of the network search service for auditing and compliance policies.

Also, as was mentioned above, and again at 350, the entire processing described above for 305-345 (the network search service) can be iterated one or more times for duplicate instances of the search and the return search instructions.

According to an embodiment, at 355, the network search service communicates the first public key to an identity service for the search service to subsequently acquire via the identity service. Similarly, the network search service communicates the second public key to the identity service for the search return process to subsequently acquire via the identity service. The identity service does not permit the search service to acquire the second public key for the temporary identity of the principal and does not permit the search return process to acquire the first public key for that temporary identity.

Figure 4:
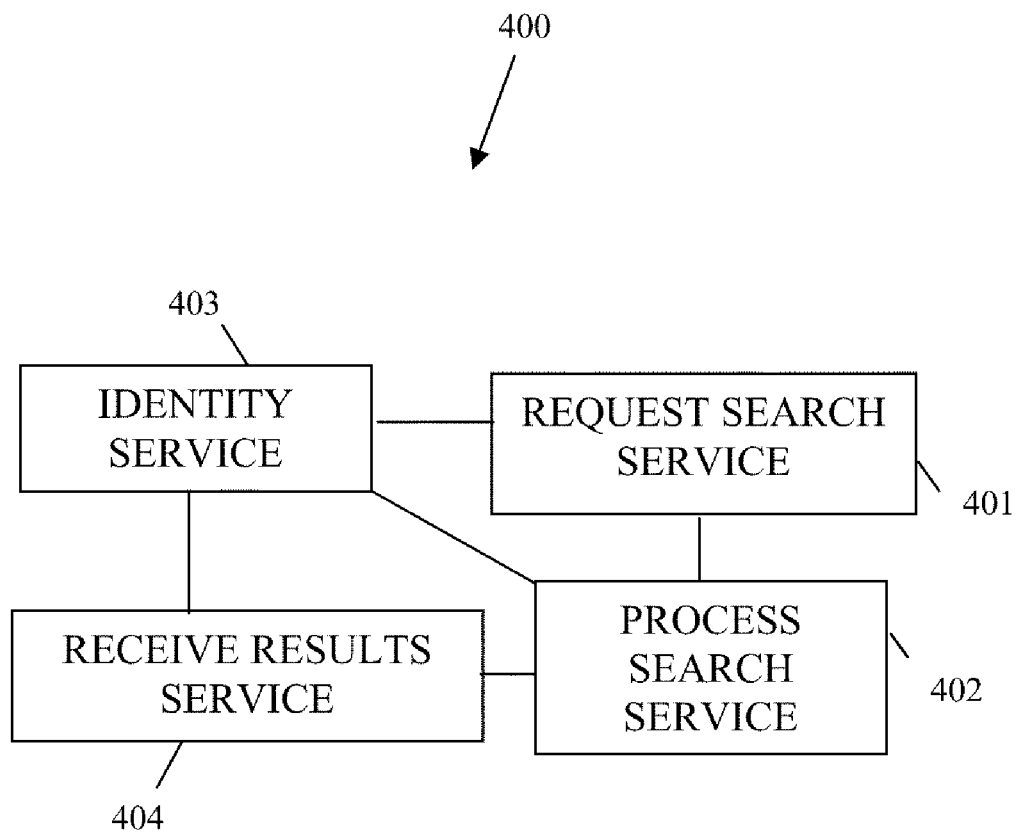
FIG. 4 is a diagram of a secure network searching system, according to an example embodiment.

FIG. 4 is a diagram a secure network searching system 400, according to an example embodiment. The secure network searching system 400 is implemented as instructions on or within a machine-accessible and readable medium. The instructions when executed by a machine performs the processing depicted in the methods 100, 200, and 300 of the FIGS. 1-3, respectively. The secure network searching system 400 is also be operational over a network that may be wired, wireless, or a combination of wired and wireless.

The secure network searching system 400 includes a request search service 401 and a process search service 402. In an embodiment, the secure network searching system 400 also includes an identity service 403 and/or a receive results service 404. Each of these and their interactions with one another will now be discussed in turn.

The request search service 401 is implemented in a machine-accessible and readable medium and processes on a machine (processing device) of the network. Example processing and features of a search service 401 were provided in detail above with reference to the security search service represented by the method 100 of the FIG. 1 and with respect to the network search service represented by the method 300 of the FIG. 3.

The request search service 401 encrypts a search of a principal using a search service public key and encrypts search return instructions for delivering search results associated with the search with a search return process public key. The search service executes the search.

Furthermore, the request search service 401 delivers the encrypted search and the encrypted search return instructions to the process search service 402.

In an embodiment, the search return instructions define a communication channel that is to be used for delivering the search results to the principal and for the search return process to abide by.

The process search service 402 is implemented in a machine-accessible and readable medium and processes in the machine or a different machine of the network. Example processing associated with the process search service 402 was also provided above with reference to the methods 100 and 300 of the FIGS. 1 and 3, respectively.

The process search service 402 delivers the encrypted search to the search service along with a first public key for the principal. Moreover, the process search service 402 delivers the encrypted search return instructions to the search return process along with a second public key for the principal.

The search is processed by the search service and then the resulting search results are encrypted by the search service using the first public key of the principal. That encrypted version is then sent to the search return process, and the search return process further encrypts the search results using the second public key of the principal. This doubly encrypted version of the search results are then sent from the search return process over the network to the principal for consumption and use by the principal.

In an embodiment, the secure network searching system 400 also includes an identity service 403. The identity service 403 is implemented in a machine-accessible and readable medium and is to process on the machine or a different machine of the network. Example, identity services 403 that can be modified to achieve the features described herein were incorporated by reference herein and above.

The identity service 403 supplies, manages, and delivers or distributes the keys in a secure and trusted fashion. Additionally, the identity service 403 supplies a temporary identity, in some cases, to the principal. The temporary identity is associated with the first and second public keys and includes first and second private keys used by the principal to decrypt the search results. In such a case, a true identity of the principal is not known to the request search service 401, the process search service 402, the search service, and the search return process—just the temporary identity is known to these resources.

In yet another embodiment, the secure network searching system 400 includes a receive results service 404. The receive results service 404 is implemented in a machine-accessible and readable medium and is to process on a different machine of the network. Example processing associated with the receive results service 404 was provided above in detail with reference to the method 200 of the FIG. 2.

The receive results service 404 receives the encrypted search results from the search return process on behalf of the principal and decrypts using multiple private keys associated with the principal. The decrypted search results are then delivered in accordance with the search return instructions to the principal.

Figure 5:
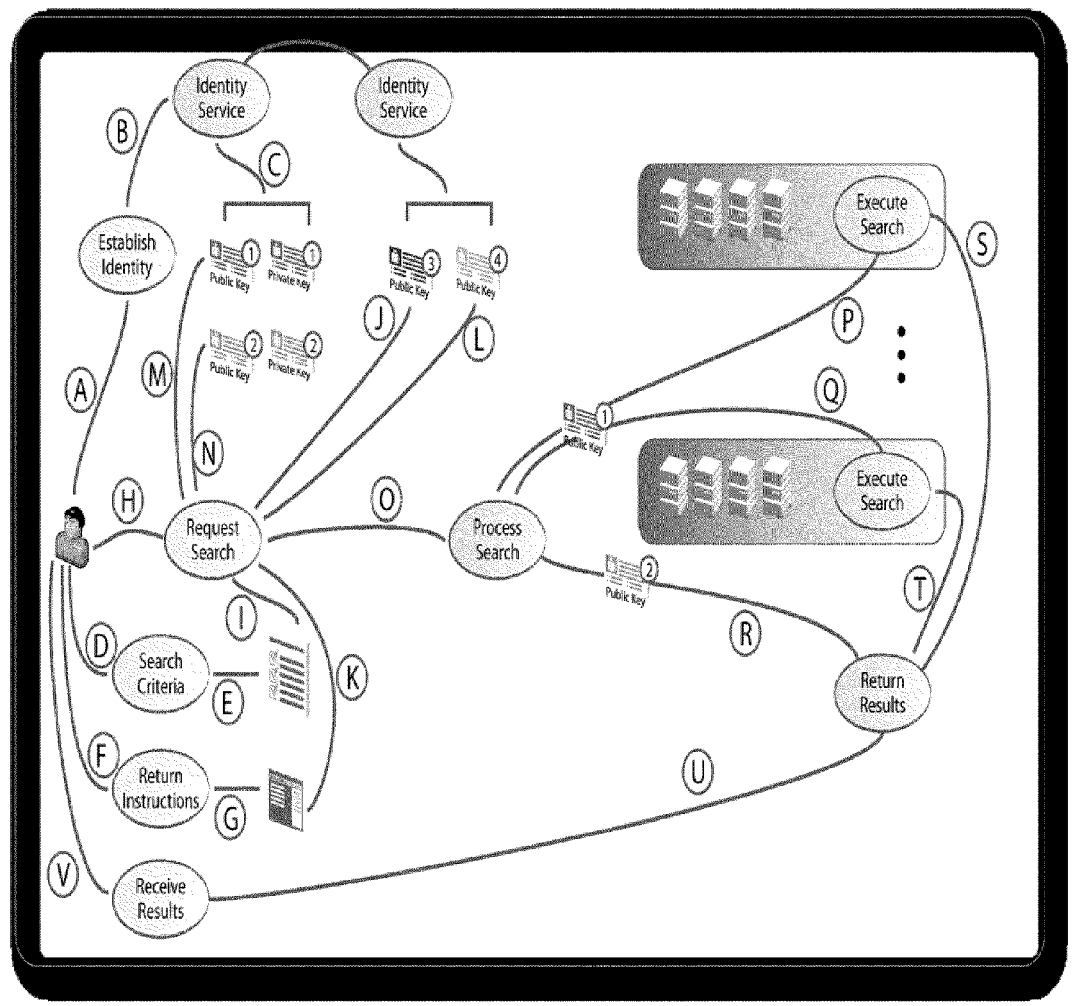
FIG. 5 is a diagram of an example architecture and interaction of components of that architecture for a secure network search system, according to an example embodiment.

FIG. 5 is a diagram of an example architecture and interaction of components of that architecture for a secure network search system, according to an example embodiment. The interaction of the components are labeled with reference letters and discussion of the interaction follows.

A user (type of principal—principal can also be an automated process or service) describes search criteria via link D. (The user is not labeled in the FIG. 5 and appears as a person in the FIG. 5.) This establishes a document (via link E) detailing the search to be performed via E (again in some cases this can be an XML document). Note that also there may be many documents that describe the search criteria.

The user describes return instructions via link F, which establishes a document (via link G) detailing how the search results are to be returned (e.g., via email, via text message, etc.—this can be XML as well). Again, note that there may be several documents that describe the return instructions for the search results.

Next, via link A, the user establishes an identity (such as temporary, aliased, masked, semantic, crafted, regular identity, etc.) via link B with an identity service. The identity service creates the appropriate identity as per policy and, as a result of policy, may create or make available Public and Private Key pairs via link C. Note that these key pairs may be already existing in the Identity Service or have been created for a specific request It is also noted that there may be identity service to identity service communication that occurs as shown in the figure but without a labeled link for that communication.

The user then accesses a request search service via link H, which results in the following taking place. The search criteria (search or search document and in an embodiment this may be many) is encrypted by the public key of the execute search process (search service) that is to be used. In an embodiment, this key is obtained via an identity service (via link J) that has a trust relationship with the identity service that the user established an identity with. In another embodiment the key is obtained from a different source that may not have a trust relationship with the User. So a variety of manners and mechanisms may be used to acquire the key in other embodiments.

Also, the request search is capable of acquiring the search criteria and the return instructions for encryption via links I and K.

The return instructions document (in an embodiment this may be many) is encrypted by the public key (via link L) of the return result process. In an embodiment, this key is obtained in the same manner as detailed above with respect to the execute search process (search service). Note in both cases above that if multiple execute search processes and return result processes are to be used that the documents will be duplicated before encryption and then encrypted with the appropriate public key is made via links J or L.

If the Public Key 1 and Public Key 2 are not available generally, then these are accessed by the request search process via links M and N and included in the search request. These are different public keys associated with the identity acquired and being used by the user to conduct the search. When all is compiled and appropriately encrypted with the appropriate Public Keys, the search request is sent to one or more process search processes via link O anonymously. Although, in some embodiments this does not have to be anonymous, since the security of the approach thus far is self-explanatory. It is well to note that the Public Key 3 and Public Key 4 (paired as they are for execute search and return results—possibly accessing multiple processes) are not the same. If they are then the search request and return information can be opened in a single security environment and the user can be associated with both the query and results.

The process search forwards the appropriate portions of the request to the execute search process(s) along with the Public Key 1 if necessary via links P and Q. The request is associated with a globally unique identifier (GUID) by the process search, which is also communicated to the execute search process(s). The GUID is for the identity being used by the user for the transaction.

That same GUID is communicated to the return results process via link R along with Public Key 2 if needed. The GUID is used by return results to match the encrypted search results sent via link S or T. When search results are ready, the return results decrypts the return instructions with its own Private Key. This is also sent in encrypted format via link R to the return results with the GUID and the Public Key 2; recall this was encrypted with Public Key 4 a public key of the return results. Similarly, the search criteria is sent via links P and Q in encrypted format using Public Key 3, a public key of the execute search. This can be multiple different keys if there are more than one execute search as shown in FIG. 5 where there are two execute searches, so there are two different public keys one for each execute search.

The execute search encrypts the results with the public key 1 and sends it to the return results via links S and T. Public key 1 is a first public key of the user or the identity for the user.

If necessary, return results further encrypts information with Public Key 2 (second public key for the identity of the user) and sends the results to receive results via link U.

Note that receive results can decrypt the messages because it holds the Private Keys (or has access to them) associated with Public Key 1 and Public Key 2. In this manner a sophisticated query can be sent to a service provider and the results sent back without revealing the identity of the user.

Finally, the decrypted search results are returned to the user via link V and in a manner originally dictated by the return results.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A non-transitory machine-readable media having code for execution on a machine, the machine when executed performing a method comprising:
   receiving, by the machine and from a principal service an identity for a principal that is associated with a search being performed by a search service and receiving return search instructions in a first encrypted format, the identity of the principal is masked or aliased preventing disclosure of a true identity for the principal;
   acquiring, by the machine and from the search service, search results in a second encrypted format for the search that was executed by the search service on behalf of the principal; and
   sending, by the machine and to the principal a decrypted version of the search results in accordance with the return search instructions.

2. The non-transitory machine-readable media of claim 1, wherein receiving further includes, receiving a public key associated with the principal from the principal service with the identity of the principal and with the return search instructions.

3. The non-transitory machine-readable of claim 2, wherein sending further includes encrypting the search results in the second encrypted format using the public key of the principal to produce a third encrypted format for the search results before the search results are sent to the principal in accordance with the return search instructions.

4. The non-transitory machine-readable media of claim 2, wherein sending further includes decrypting the first encrypted format of the return search instructions using a private key before sending the search results to the principal in accordance with the return search instructions.

5. The non-transitory machine-readable media of claim 1, wherein acquiring further includes acquiring a reference to the identity with the search results and matching that reference to the identity of the principal to ensure the search results, which are in the second encrypted format, are for the principal and the search.

6. The non-transitory machine-readable media of claim 1, wherein sending further includes sending the search results to the principal in the second encrypted format, which was acquired from the search service and wherein that second encrypted format was encrypted by the search service using a public key of the search service and not known to the processing of the method.

7. The non-transitory machine-readable media of claim 1, wherein acquiring further includes recognizing the first encrypted format as being disparate and different from the second encrypted format.

8. A non-transitory machine-readable media having code for execution on a machine, the machine when executed performing a method comprising:
   acquiring, by the machine, a temporary identity for a principal from an identity service along with a first public key, a first private key, a second public key, and a second private key for the temporary identity, the temporary identity masked a true identity for the principal;
   acquiring, by the machine and from the identity service, a search service public key for a search service and a return result's public key for a search return process, the search service to process a search on behalf of the principal and then communicate the search results to the search return process in an encrypted format that uses the first public key, the first public key known to the search service but the first public key is not known to the search return process and the second public key known to the search return process but the second public key is not known to the search service;
   encrypting the search in a first format using the search service public key;
   encrypting return search instructions for the search results in a second format using the return result's public key;
   sending the encrypted search in the first format to the search service over a wide-area network (WAN) connection;
   sending the encrypted return search instructions in the second format to the search return process over the WAN connection;
   receiving the search results from the search return process in response to the search service performing the search and receiving the search results in a third encrypted format and in accordance with the return search instructions; and
   decrypting the third encrypted format that the search results are in using one or more of the first private key and the second private key and providing the search results to the principal for use.

9. The non-transitory machine-readable media of claim 8 wherein the method further comprises, supplying a reference to the temporary identity for the principal to the search service and the search return process to ensure the search return process can match the search results received from the search return process to the temporary identity, and wherein a true identity for the principal remains unknown to the search service and to the search return process.

10. The non-transitory machine-readable media of claim 8 wherein the method further comprises sending the first public key to the search service to encrypt the search results in a format that cannot be decrypted by the search return process and sending the second public key to the search return process to provide the search results in the third encrypted format.

11. The non-transitory machine-readable media of claim 10 wherein the method further comprises, recognizing the third encrypted format of the search results as a dual encrypted format that includes the encrypted format used by the search service using the first public key, which is not known to the search return process, and includes the third encrypted format that uses the second public key, which is not know to the search service.

12. The non-transitory machine-readable media of claim 8 wherein the method further comprises, communicating the first public key to the identity service for the search service to subsequently acquire and to encrypt the search results before providing the search results to the search return process and also communicating the second public key to the identity service for the search return process to subsequently acquire to produce the third encrypted format for the search results, and wherein the first public key is not accessible to the search return process via the identity service and the second public key is not accessible to the search service via the identity service.

13. The non-transitory machine-readable media of claim 8 wherein the method further comprises, iterating the processing of the method for duplicate instances of the search and the return search instructions with different keys associated with different search services and different search return processes.

14. A machine-implemented system, comprising:
a machine having memory configured with executable instructions for a request search service that processes on the machine; and
the machine or a different machine having memory configured with executable instructions for a process search service that processes on the machine or the different machine;
wherein the request search service encrypts a search of a principal using a search service public key and encrypts search return instructions for delivering search results associated with the search service processing the search with a search return process public key, and wherein the encrypted search and search return instructions are delivered to the process search service, and wherein the process search service delivers the encrypted search to the search service along with a first public key for the principal and delivers the encrypted search return instructions to the search return process along with a second public key of the principal, and wherein the search is processed and the search results are encrypted by the search service using the first public key and delivered to the search return process, and the search return process encrypts the search results again with the second public key and then delivers the encrypted search results to the principal, and wherein a true identity of the principal is masked for the search processing.

15. The machine-implemented system of claim 14 further comprising, the machine or the different machine configured with additional executable instructions for an identity service implemented in a machine-accessible and readable medium that processes on the machine or the different machine, wherein the identity service supplies, manages, and delivers the keys in a secure and trusted fashion.

16. The machine-implemented system of claim 15, wherein the identity service supplies a temporary identity to the principal that is associated with the first and second public keys and first and second private keys, and wherein a true identity of the principal is not known to the request search service, the process search service, the search service, and the search return process, just the temporary identity is known to these resources.

17. The machine-implemented system of claim 14 further comprising, the machine or the different machine having additional executable instructions for a receive result's service that processes on the machine or the different machine, and wherein the receive result's service receives the encrypted search results from the search return process on behalf of the principal and decrypts using multiple private keys associated with the principal to deliver the search results in accordance with the search return instructions.

18. The machine-implemented system of claim 14, wherein the encrypted search is in a different encrypted format encryption associated with the encrypted search return instructions.

19. The machine-implemented system of claim 14, wherein the encrypted search and the encrypted search return instructions are both originally produced by the principal.

20. The machine-implemented system of claim 19, wherein decrypted version of the encrypted search and the encrypted search return instructions are extensible markup language (XML) encoded documents.

\* \* \* \* \*